Patented June 1, 1948

UNITED STATES PATENT OFFICE 2,442,652

INSECTICIDES

Theodore W. Kerr, Jr., Seymour, and Walter D. Harris, Naugatuck, Conn., assignors to United States Rubber Company, New York, N. Y., a corporation of New Jersey No Drawing. Application June 19, 1945, Serial No. 600,410

6 Claims. (Cl. 167—30)

This invention relates to improvements in insecticides. The term "insecticide" is considered to include larvaecides, arachnicides, and insect repellents or insectifuges, and is to be construed in accordance with the Insecticide Act of 1910, section 6.

We have discovered that mixtures of 2,2-bis(p-chlorophenyl)-1,1,1-trichloroethane and an alkenyl naphthyl ether, for example, allyl or methallyl naphthyl ether, exhibit a synergistic insecticidal action. The insecticidal action of the 2,2-bis(p-chlorophenyl)-1,1,1-trichloroethane is disclosed in United States Patent to Müller No. 2,329,074, reissued as Re. 22,700.

The mixtures of the 2,2-bis(p-chlorophenyl)-1,1,1-trichloroethane and the alkenyl naphthyl ether may be applied to loci to be protected against insects in undiluted form, or as dusts in admixture with powdered solid inert carriers, such as clay or talc, or as liquids or sprays when in a liquid carrier, as in solution in a suitable mutual solvent, or in suspension in a suitable non-solvent medium, for example, water. In protecting plants (the term including plant parts) which are subject to attack by insects, the mixture of the chemicals may readily be applied in aqueous suspension, preferably containing a dispersing agent.

The following examples, which are illustrative of the invention, clearly show the synergistic insecticidal effect of mixtures of 2,2-bis(p-chlorophenyl)-1,1,1-trichloroethane and alkenyl naphthyl ethers. The 2,2-bis(p-chlorophenyl)-1,1,1-trichloroethane used was prepared in the conventional manner by reacting 1 mol of chloral with 2 mols of monochlorobenzene in the presence of an excess of concentrated sulfuric acid. After the reaction had stopped, the mixture was poured into a large amount of water, whereupon the 2,2-bis(p-chlorophenyl)-1,1,1-trichloroethane separated out. It may be washed and recrystallized from alcohol.

The effectiveness of 2,2-bis(p-chlorophenyl)-1,1,1-trichloroethane, allyl 2-naphthyl ether, methallyl 2-naphthyl ether, and mixtures of the 2,2-bis(p-chlorophenyl)-1,1,1-trichloroethane with the allyl 2-naphthyl ether, and with the methallyl 2-naphthyl ether, was tested against the potato aphid, *Macrosiphum solanifolii*, by spraying potato plants infested with the aphids with aqueous dispersions of the chemicals containing a small amount of a commercial dispersing agent which is a polyethylene glycol condensate, believed to be the reaction product of ethylene oxide and castor oil, and with mixtures of the dispersions of the chemicals. There were 166 to 363 potato aphids on the plants in each test. Observations as to mortality of the aphids were made after 44 hours. The percentage mortality of the potato aphids on untreated plants was 0.5%, on plants treated with 1–1066 dilution of allyl 2-naphthyl ether was 24.3%, on plants treated with 1–1066 dilution of methallyl 1-naphthyl ether was 0.6%, and on plants treated with 1–3200 dilution of 2,2-bis(p-chlorophenyl)-1,1,1-trichloroethane was 11.8%. A mixture of 1–1066 dilution of allyl 2-naphthyl ether and 1–3200 dilution of 2,2-bis(p-chlorophenyl)-1,1,1-trichloroethane gave 95.9% mortality of the aphids, and a mixture of 1–1066 dilution of methallyl 1-naphthyl ether and 1–3200 dilution of 2,2-bis(p-chlorophenyl)-1,1,1-trichloroethane gave 76.5% mortality of the aphids.

The synergistic insecticidal action of compositions containing 2,2-bis(p-chlorophenyl)-1,1,1-trichloroethane and alkenyl naphthyl ethers is clearly demonstrated by the much greater total effect of the mixture than the sum of the two effects taken independently.

Having thus described our invention, what we claim and desire to protect by Letters Patent is:

1. An insecticidal composition containing 2,2-bis(p-chlorophenyl)-1,1,1-trichloroethane and an alkenyl naphthyl ether having 3 to 4 carbon atoms in the alkenyl radical.

2. An insecticidal composition containing 2,2-bis(p-chlorophenyl)-1,1,1-trichloroethane and allyl 2-naphthyl ether.

3. A method which comprises applying to loci to be protected against insects a composition containing 2,2-bis(p-chlorophenyl)-1,1,1-trichloroethane and an alkenyl naphthyl ether having 3 to 4 carbon atoms in the alkenyl radical.

4. A method which comprises applying to loci to be protected against insects a composition containing 2,2-bis(p-chlorophenyl)-1,1,1-trichloroethane and allyl 2-naphthyl ether.

5. An insecticidal composition containing 2,2-bis(p-chlorophenyl)-1,1,1-trichloroethane and methallyl 2-naphthyl ether.

6. A method which comprises applying to loci to be protected against insects a composition containing 2,2-bis(p-chlorophenyl)-1,1,1-trichloroethane and methallyl 2-naphthyl ether.

THEODORE W. KERR, JR.
WALTER D. HARRIS.

REFERENCES CITED

The following references are of record in the file of this patent:

UNITED STATES PATENTS

| Number | Name | Date |
|---|---|---|
| Re. 22,700 | Muller | Dec. 4, 1945 |

OTHER REFERENCES

Dictionary of Organic Compounds, by Heilbron, 1936 ed., vol. 2, pages 42 and 77.